May 5, 1942.  E. K. HAMLEN  2,282,282
METHOD AND APPARATUS FOR MANUFACTURING PIPES
Filed Aug. 26, 1941    6 Sheets-Sheet 5
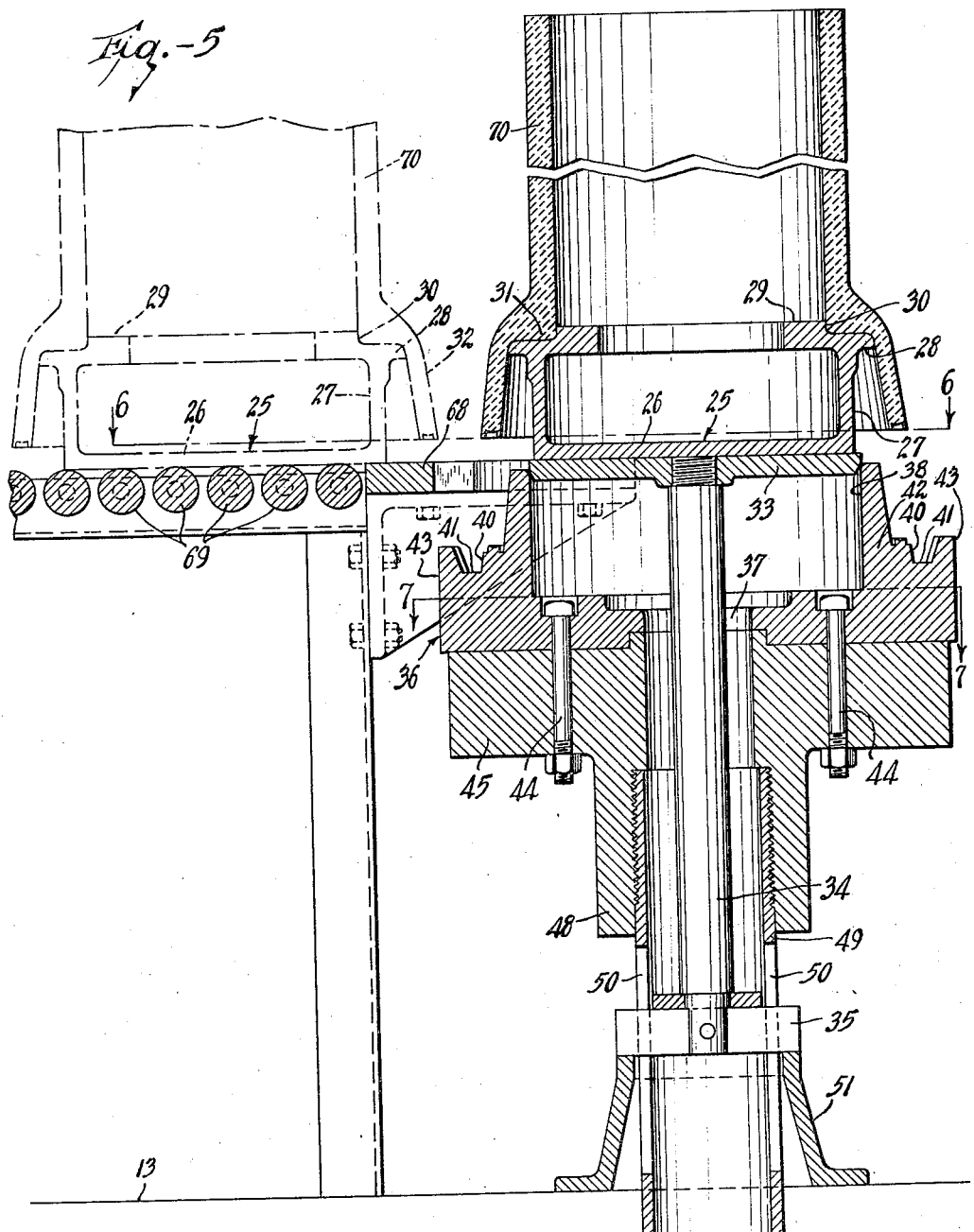
INVENTOR
EARLE KENNETH HAMLEN
BY
ATTORNEYS

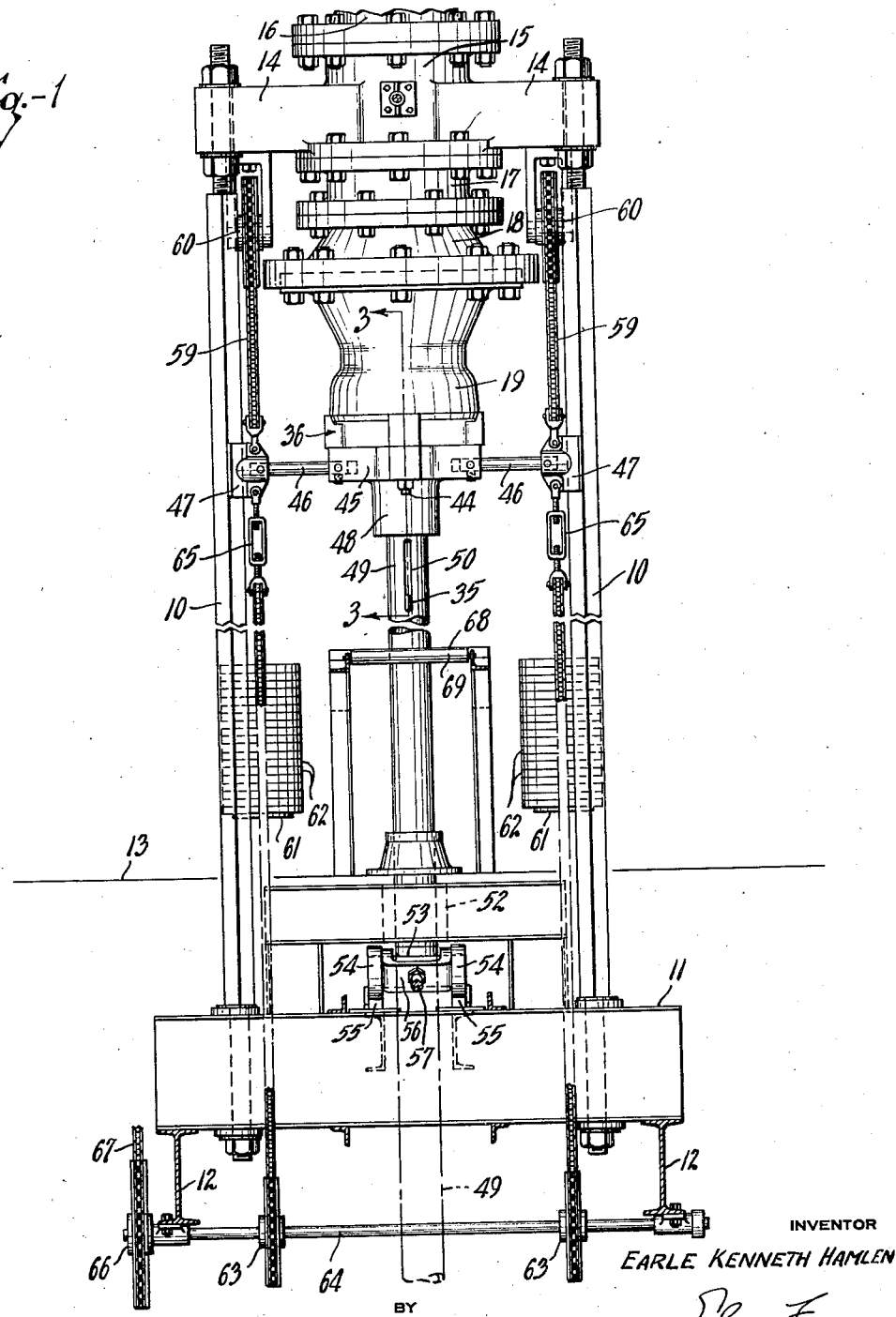

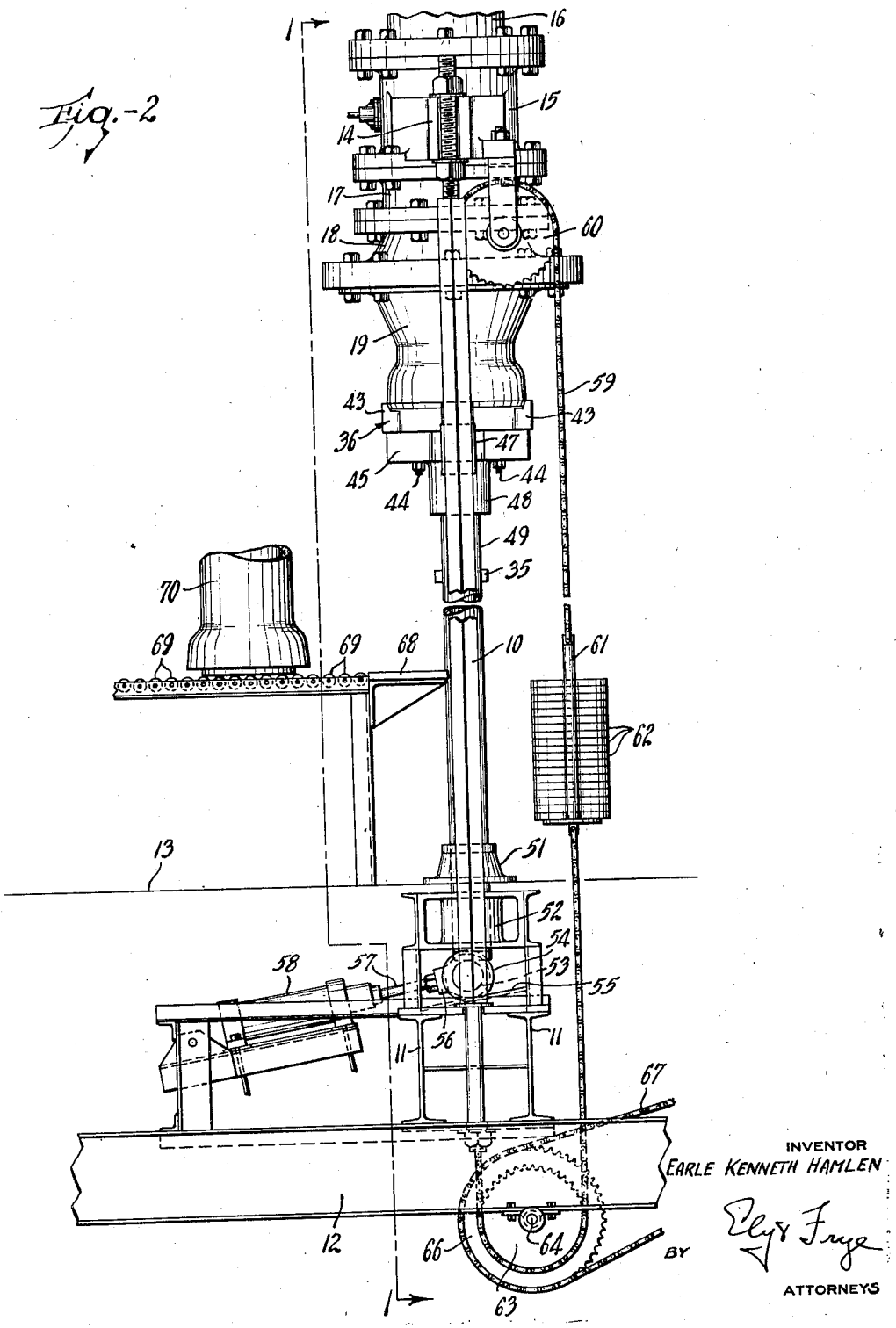

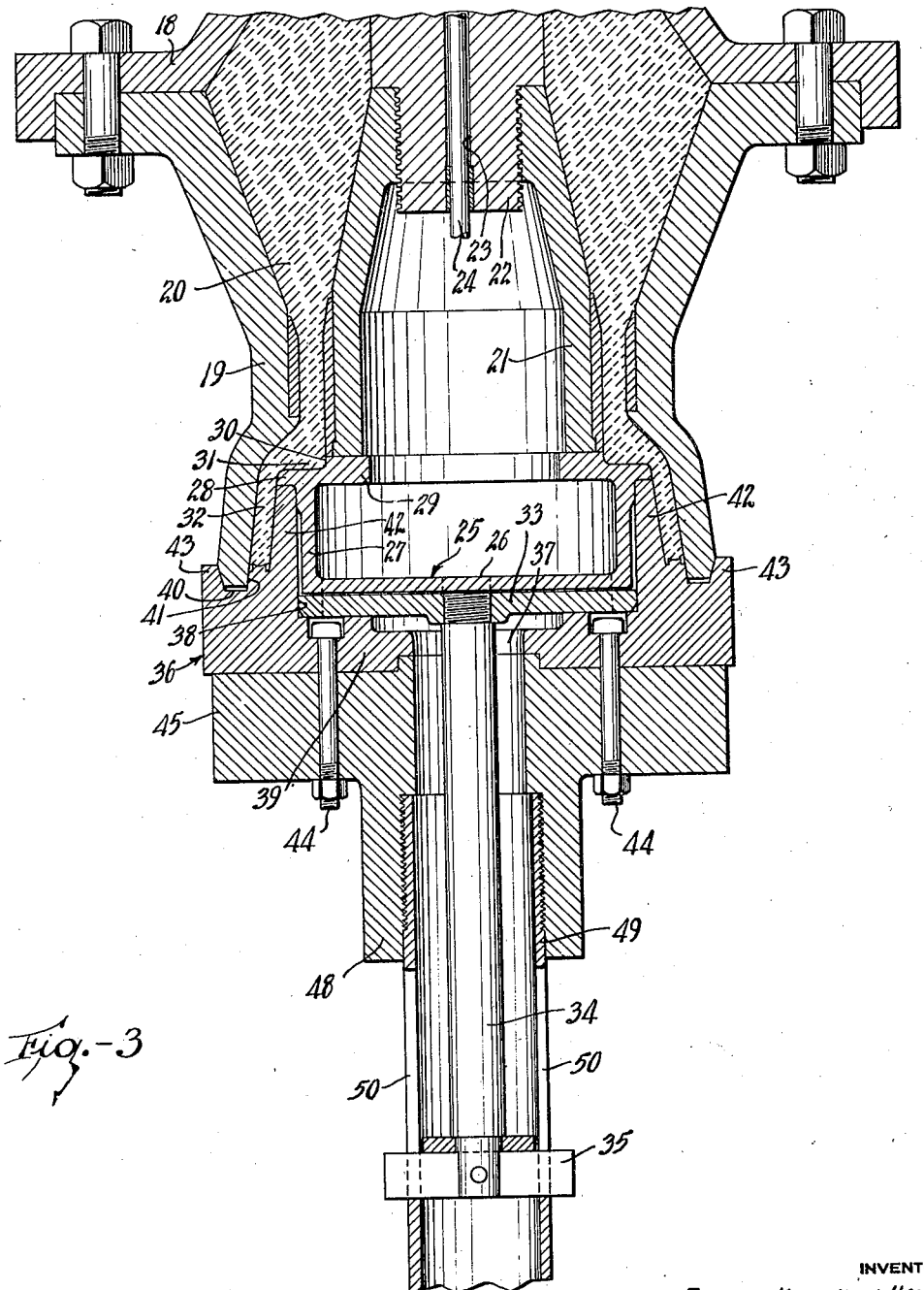

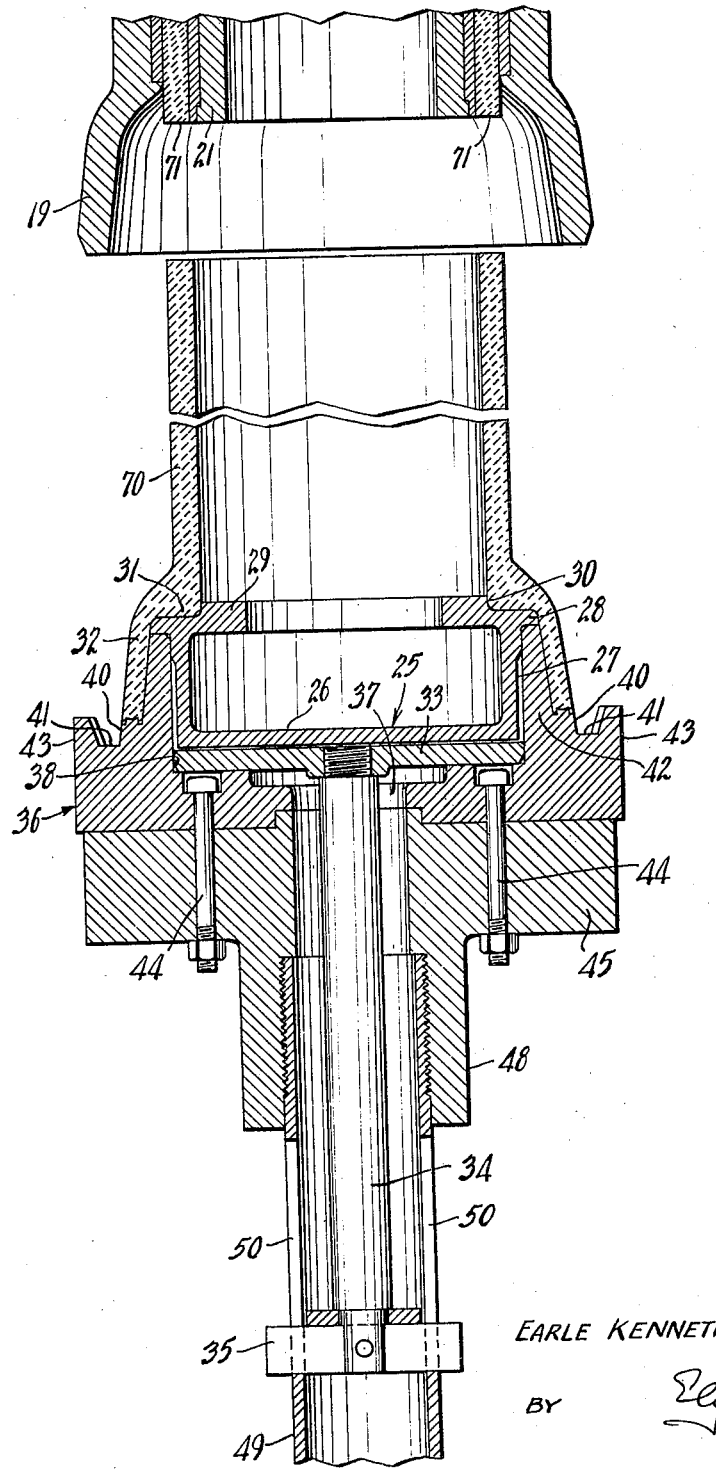

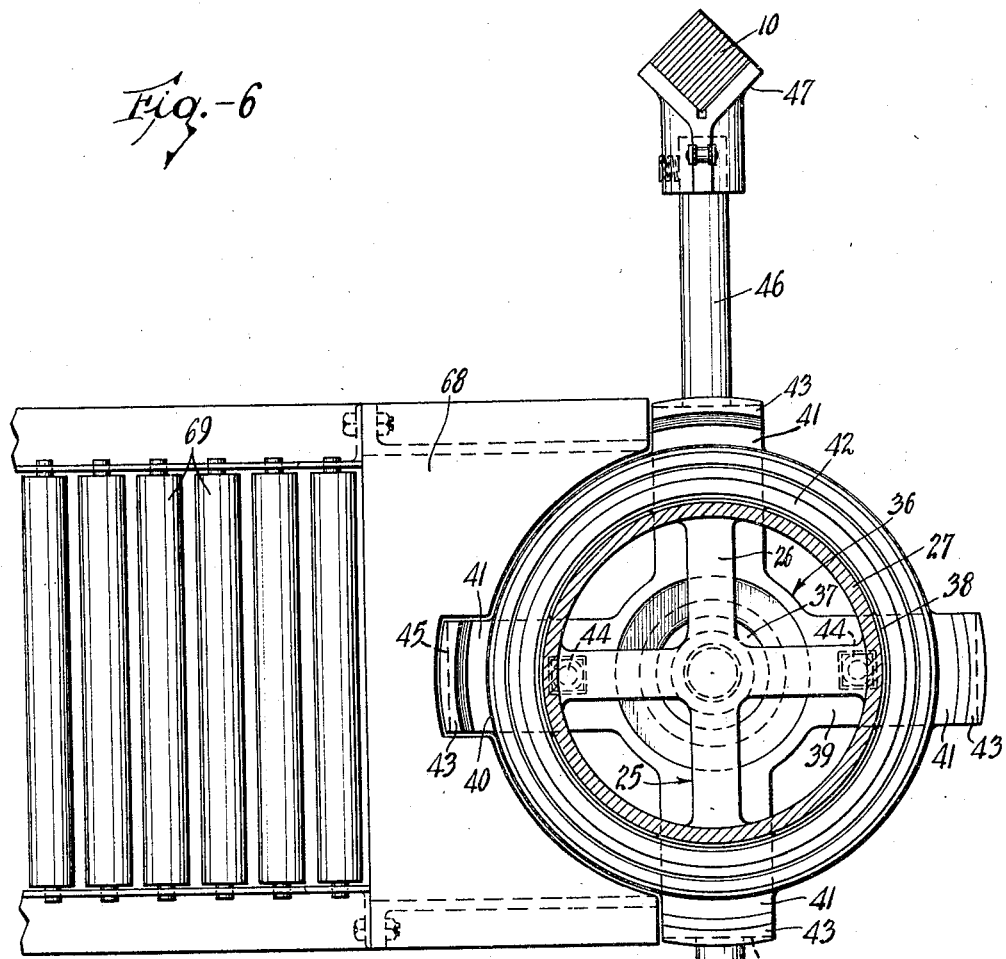
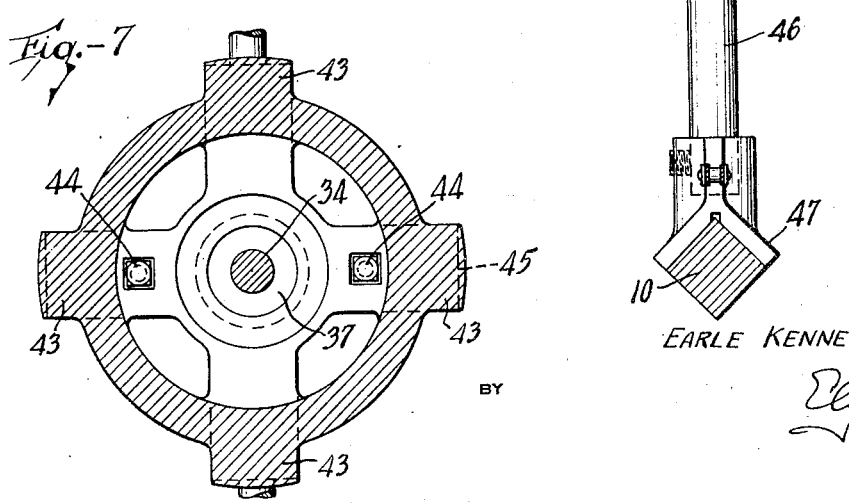

Patented May 5, 1942

2,282,282

UNITED STATES PATENT OFFICE 2,282,282

METHOD AND APPARATUS FOR MANUFACTURING PIPE

Earle Kenneth Hamlen, Akron, Ohio, assignor to The Robinson Clay Product Company, Akron, Ohio, a corporation of Maine Application August 26, 1941, Serial No. 408,342

10 Claims. (Cl. 25—39)

This invention relates to improvements in a method and apparatus for manufacturing pipe formed from clay or other plastic material, which pipe is extruded through a die and formed with a socket on one end.

At the present time the practice most generally followed in making clay pipe having a socket end requires the clay to be extruded through a die against a former which shapes the socket end. As soon as the socket end is shaped, the former is lowered the required distance and additional clay is extruded which forms a part of the body portion of the pipe. Then the extrusion is stopped temporarily, the former is lowered out of the socket end of the pipe, and a socket board shaped to fit the socket end of the pipe is placed in the latter. Additional clay is then extruded to complete the body portion of the pipe, after which the supply of clay is cut off at the top. The pipe with the socket board still in the lower end is then reversed so that the socket end is up instead of down, and the pipe is dried and burned in the latter position with the socket board removed.

In addition to the inconvenience and loss of time occasioned by temporarily stopping the extrusion and replacing the former with the socket board, it is not always possible to correctly fit the socket board into the socket end of the pipe, resulting in an unsatisfactory product.

These and other disadvantages are well known in the art and it is an object of this invention to overcome the same by providing an improved method which continuously extrudes the clay and which obviates the need for replacing the former with a socket board, by making use of a socket ring which remains in place during the entire extrusion process and until the extruded pipe is turned over with its socket end up. In this method the former is removable from around the socket ring when the latter reaches the limit of its downward movement so that the former is entirely clear of the pipe and socket ring when the pipe is in position to be removed from the press and turned over.

Another object is to provide an improved apparatus for extruding or pressing pipe of the character referred to having novel means for carrying out the improved method, including a socket ring which remains in engagement with the shoulder of the socket end of the pipe from the time of initial extrusion until the pipe is reversed with its socket end up.

Other objects and advantages will become apparent from the following description taken in conjunction with the accompanying drawings.

In the drawings:

Fig. 1 is a front elevation of the apparatus with parts broken away at the top,

Fig. 2 is a side elevation of same with parts broken away,

Fig. 3 is an enlarged section taken substantially on line 3—3 of Fig. 1,

Fig. 4 is a similar section showing a completed extruded pipe with the parts below the pipe moved downwardly, Fig. 5 is a similar section with the parts below the pipe at the lower end of their movement, Fig. 6 is a section taken substantially on line 6—6 of Fig. 5, and Fig. 7 is a section taken substantially on line 7—7 of Fig. 5.

Referring to the drawings the numeral 10 indicates a pair of vertical side arms or guide rods of square cross-section supported at their lower ends on transverse beams 11 which in turn are supported on a pair of horizontal beams 12. Beams 11 and 12 are preferably located below the floor line 13 and additional supports (not shown) may be utilized to maintain the arms 10 in proper position. Adjacent their upper ends, arms 10 are connected by a cross-head 14 preferably formed integral with and extending outwardly from a spider ring 15 secured below and in communication with a clay cylinder 16. An extension ring 17 is secured between ring 15 and a die holding ring 18 which carries a die 19. As shown in Figs. 1 and 2, suitable flanges and securing means are provided for the various rings. Clay is adapted to be forced in the usual manner from clay cylinder 16 through the various rings and into die 19. Since the means for forcing the clay through cylinder 16 is conventional it has not been illustrated, but it will be understood that this means comprises a piston operated by steam or other pressure to force the clay through cylinder 16.

Referring now to Fig. 3, the clay is indicated by numeral 20, and it will be observed that this clay has been forced downwardly between die 19 and die core 21 which is threaded onto a die core holding rod 22 secured at its upper end to the spider ring 15. Rod 22 has a central longitudinal opening 23 which receives a rotatable knife carrying shaft 24 adapted to carry a knife (not shown) for cutting off the clay after the desired length of pipe has been extruded.

The foregoing elements are all conventional and well understood in the art and form no part of the present invention except as they cooperate to produce the finished pipe.

Numeral 25 designates a socket ring as a whole having a base portion 26 formed as a spider (see Fig. 6) and an annular side wall 27. Wall 27 is formed with an outwardly extending flange 28 and an inwardly extending flange 29 of greater thickness than flange 28 so as to provide an annular shoulder 30, with the upper surface of flange 29 in engagement with the lower end of die core 21. As clearly shown in Fig. 3, the upper surface of flange 28 and the shoulder 30 define the shoulder 31 of pipe socket 32 as clay is extruded from die 19. Socket ring 25, when not engaged by the former to be described, is supported on a lifting plate 33 formed as a spider having arms aligned with and extending slightly beyond the arms of base 26 of the socket ring. A supporting rod 34 is threaded at its upper end into the central portion of lifting plate 33 and the lower end of this rod is provided with a transverse stop arm 35 for a purpose to be described.

A former, indicated as a whole by numeral 36, is arranged to substantially surround the base and side wall of socket ring 25 so as to receive the lower end of die 19 and permit the formation of the socket end of the pipe. Former 36 has a central opening 37 and from this opening to shoulder 38 the base 39 of the former is of spider shape (see Fig. 6). From shoulder 38 to the inner walls 40 of grooves 41 the former has a completely annular portion 42 that tapers upwardly into engagement with the lower surface of flange 28 and serves to support the socket ring 25, as shown in Fig. 3. Outwardly of said inner walls 40 of grooves 41, the former is provided with four spaced extensions 43, as clearly shown in Fig. 6. Thus, grooves 41 are provided only in the extensions 43 and these grooves receive the annular lower end of die 19, as shown in Fig. 3, to form an annular space between die 19 and the upwardly extending annular portion 42 of the former 36, which space shapes the socket end of the pipe as the clay is extruded thereinto.

Secured to the lower surface of former 36, by countersunk bolts 44, is a former support 45 also shaped as a spider with arms terminating short of the ends of extensions 43. A pair of guide arms 46 (Fig. 1) are suitably secured at their inner ends to former support 45 and the outer ends of these arms are suitably secured to guide shoes 47 which are slidably mounted for vertical movement on guide rods 10. The former support 45 has a depending sleeve 48 which receives the threaded upper end of a supporting rod 49 which surrounds rod 34 and has a pair of oppositely disposed elongated openings 50 through which the outer ends of stop arm 35 extend. Rod 49 extends through a collar 51 arranged at the floor line 13, and through a bearing sleeve 52 suitably supported on beams below the floor line so that when this rod is in its upper position the lower end may engage a shaft 53 having mounted on its ends a pair of rollers 54 which move along an inclined trackway 55.

A yoke 56 is mounted on the shaft 53 (Fig. 1) inwardly of rollers 54 and receives one end of a piston rod 57, the other end of which is slidably mounted in a conventional fluid cylinder 58 (Fig. 2), the arrangement being such that when piston rod 57 is operated in one direction the shaft 53 will move on rollers 54 up the trackway 55 and force rod 49 upwardly to insure a tight engagement between former 36 and die 19, and between socket ring 25 and die core 21. As long as shaft 53 is in the path of movement of rod 49, the latter cannot be moved downwardly. When it is desired to move rod 49 downwardly, the shaft 53 may be retracted by operating piston rod 57 in the opposite direction, thus permitting rod 49 to be moved downwardly as indicated in broken lines in Fig. 1.

To control the movement of rod 49 and the parts moved therewith, a pair of sprocket chains 59 are secured at one end in the front of the apparatus to the upper portion of each guide shoe 47 and these chains pass to the rear side of the apparatus over sprocket wheels 60 mounted for rotation adjacent the upper ends of side arms 10. In the rear, chains 59 are then connected to the upper ends of weight carrying members 61 which are adapted to carry a plurality of counterweights 62, and from the lower ends of the members 61, these chains return to the front of the apparatus around a pair of driven sprocket wheels 63 secured on a driven shaft 64, suitably mounted below the floor line 13. After passing around sprocket wheels 63 the chains 59 extend upwardly for connection with turnbuckles 65 which in turn are connected to the lower portion of each guide shoe 47. The weights 62 have a normal tendency or bias to cause the rod 49 and the parts of the apparatus moved thereby to move upwardly and to remain in their upper position, and the turnbuckles permit adjustments in the effective lengths of the chains. A drive sprocket wheel 66 is secured on shaft 64 and a drive chain 67 connects wheel 66 to a suitable source of power such as a motor (not shown) whereby operation of the motor will control vertical movement of the rod 49 and the parts moved therewith in a manner to be later described.

In front of the apparatus, at a predetermined height above the floor line a table 68 is arranged. The height of the table in this instance is equal to the distance from the upper surface of carrying plate 33 to the lower surface of stop arm 35, plus the distance collar 51 extends above the floor line, whereby when stop arm 35 engages the upper end of collar 51 (Fig. 5), the lower surface of socket ring 25 will be flush with the upper surface of the table. A plurality of rollers 69 are arranged in front of table 68 for a purpose to be described.

In operation, the parts are placed in the position shown in Figs. 1, 2, and 3 with socket ring 25 in engagement with die core 21 and former 36 in engagement with die 19. Clay 20 is then extruded downwardly until the socket end of the pipe is formed as shown in Fig. 3. The formation of the socket end can be determined by observing clay issuing at the bottom of the inner wall of die 19 between extensions 43 where a slight overflow of about 1/64 of an inch will occur when the formation is complete.

As soon as the socket end is formed, it is necessary to lower the socket ring 25, former 36, former support 45, and the supporting rods 34 and 49. At first the weight of the clay on the socket ring and former plus the pressure exerted on the clay by the steam piston causes these parts to move downwardly against the action of counterweight 62. As will be observed from Fig. 4, these parts move downwardly away from die 19 and die core 21, permitting the body of the pipe to be formed by continued extrusion of the clay. When sufficient clay has passed to complete the size of pipe desired, the knife previously referred to cuts the clay off and a complete section of pipe 70 is formed. The knife has not been illustrated since it is conventional and its operation understood in this art, it being adapted to cut the clay immediately below the end of die core 21, at the point indicated by the numeral 71 (Fig. 4). After the cutting operation and pipe section 70 has been formed, the weight of this section is sufficient to continue to move the movable parts downwardly against the action of weights 62, and at this time the motor is preferably utilized as a brake to slow down the descent of the movable parts until stop arm 35 engages collar 51.

The next step is to lower the former and former support while leaving the pipe supported on the socket ring and this is accomplished by positive driving action of the motor which causes the former and former support to move downwardly after the socket ring has stopped. As will be noted in Fig. 3, the stop arm 35 on rod 34 is at the lower end of slots 50 in rod 49 when the parts are in their upper position. Stop arm 35 remains at the lower end of this slot until it engages the upper end of collar 51, after which time the downward movement of rod 49 becomes relative to that of rod 34 whereby the movement of rod 34 stops and that of rod 49 continues until former 36 is below the upper surface of the lifting plate 33 as shown in Fig. 5. During the relative movement of rods 34 and 49 which is permitted by slots 50, the rod 49 and the former and former support can move downwardly for a distance equal to the length of slots 50, but it may not always be necessary to utilize all of this distance, which is the situation illustrated in Fig. 5. It will be seen from Figs. 5 and 6 that table 68 is shaped to readily allow the former and former support to pass to the rear of the table without contacting the latter.

As soon as the former 36 is below the upper surface of lifting plate 33 (Fig. 5), socket ring 25 and pipe section 70 supported thereby are moved forwardly onto table 68 and then over rollers 69 as indicated in Fig. 2 and in broken lines in Fig. 5 to a suitable turning device (not shown) where the pipe section may be reversed so as to be dried and burned with its socket end up instead of down.

It will be apparent that the method and apparatus described provide continuous support for the socket end of the pipe until it is reversed and that they fully overcome all the disadvantages of the previous practice.

While I have illustrated and described the preferred method and apparatus for practicing my invention it will be apparent that the invention is not so limited, and that changes and modifications may be made therein without departing from the spirit of the invention or from the scope of the subjoined claims.

What is claimed is:

1. In apparatus for manufacturing plastic pipe having a socket end, in combination, a press including a die and a die core, a socket ring engaging said die core, a former engaging said die and said socket ring, a former support secured to said former, means for lowering said socket ring, former and former support in unison for a predetermined distance, and means thereafter operable for retarding movement of said socket ring while continuing the lowering of said former and former support.

2. In apparatus for manufacturing plastic pipe having a socket end, in combination, a press including a die and a die core, a socket ring engaging said die core, a former engaging said die and said socket ring, a former support secured to said former, a rod depending from said former support and having an elongated opening therein, a second rod supporting said socket ring and extending partially through said first rod, and a stop arm on said second rod and movable in said slot.

3. In apparatus for manufacturing plastic pipe having a socket end, in combination, a press including a die and a die core, a socket ring engaging said die core, a former engaging said die and said socket ring, a former support secured to said former, a rod depending from said former support and having an elongated opening therein, a second rod supporting said socket ring and extending partially through said first rod, a stop arm on said second rod and extending through said slot, means for lowering said rods, socket ring, former and former support in unison for a predetermined distance, and an obstruction arranged in the path of said stop arm to retard movement of said socket ring and said record rod while continuing the lowering of said first rod and said former and former support.

4. Apparatus as recited in claim 3 wherein said obstruction comprises a collar through which said first rod is movable.

5. Apparatus as recited in claim 3 wherein a table is arranged adjacent said first rod, the upper surface of said table being flush with the lower surface of said socket ring after the lowering movement of the latter and said second rod is retarded.

6. In apparatus for manufacturing plastic pipe having a socket end, in combination, a press including a die and a die core, a socket ring engaging said die core, a former engaging said die and said socket ring, a former support secured to said former, a rod depending from said former support, and wedging means engaging the lower end of said rod to maintain said engagements with said die and die core.

7. Apparatus as recited in claim 6 wherein said wedging means comprises a shaft, rollers on said shaft, and a trackway for said rollers, said trackway being inclined with respect to the end of the shaft.

8. In the method of manufacturing plastic pipe having a socket end, the steps of extruding plastic material against a socket ring and a former to form the socket end of the pipe, lowering the socket ring and former with the socket end in engagement therewith while forming the body of the pipe, cutting the plastic material after the body is formed, and thereafter lowering the former while leaving the socket ring in engagement with the pipe.

9. In the method of manufacturing plastic pipe having a socket end, the steps of extruding plastic material against a socket ring and a former to form the socket end of the pipe, lowering the socket ring and former with the socket end of the pipe in engagement therewith, and thereafter moving the former relatively of the socket ring to leave the latter in engagement with said socket end.

10. Apparatus of the character described comprising means for extruding plastic pipe material including a die and a die core, a socket ring engaging said die core, a former engaging said die and socket ring, means for downwardly moving said socket ring and former in unison for a predetermined distance, and means thereafter operable to stop the movement of said socket ring while continuing the downward movement of said former, said last named means including a pair of rods one within the other and supporting respectively said socket ring and said former, the outer of said rods having a pair of oppositely disposed longitudinal elongated openings therein and the inner of said rods having a transverse member extending outwardly through said openings, and a collar through which the outer of said rods is freely movable while the transverse member on the inner of said rods prevents movement of the latter rod therethrough.

EARLE KENNETH HAMLEN.